Figure 1:
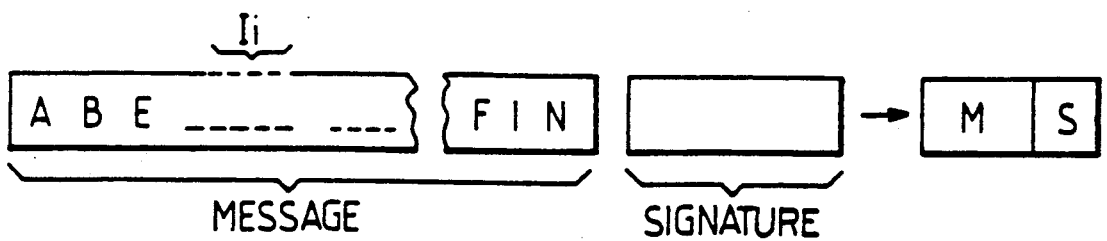

United States Patent [19]
Camion et al.

[11] Patent Number: 5,097,504
[45] Date of Patent: Mar. 17, 1992

[54] METHOD AND DEVICE FOR QUALITATIVE SAVING OF DIGITIZED DATA

[75] Inventors: Paul Camion, Plaisir; Jean Goutay, La Celle St Cloud; Sami Harari, Près Toulon, all of France

[73] Assignee: Infoscript, Paris, France

[21] Appl. No.: 130,534

[22] PCT Filed: Mar. 18, 1987

[86] PCT No.: PCT/FR87/00079
§ 371 Date: Nov. 18, 1987
§ 102(e) Date: Nov. 18, 1987

[87] PCT Pub. No.: WO87/05726
PCT Pub. Date: Sep. 24, 1987

[30] Foreign Application Priority Data

Mar. 19, 1986 [FR] France .................. 86 03933

[51] Int. Cl.$^5$ .............. G06K 9/62; G06F 12/14; G07F 7/10
[52] U.S. Cl. ................................ 380/23; 380/4; 380/22; 380/25; 380/30; 340/825.31; 340/325.34
[58] Field of Search ............... 380/3–5, 380/22–25, 49, 50, 52, 30; 340/825.31, 825.34

[56] References Cited

U.S. PATENT DOCUMENTS

| 4,211,919 | 7/1980 | Ugon | 235/487 |
| 4,656,474 | 4/1987 | Mollier et al. | 380/23 |
| 4,796,181 | 1/1989 | Wiedemer | 380/4 X |

FOREIGN PATENT DOCUMENTS

| 0089876 | 9/1983 | European Pat. Off. |
| 2266222 | 10/1975 | France. |
| 2140179 | 11/1984 | United Kingdom. |
| 2163577 | 2/1986 | United Kingdom. |

Primary Examiner—Stephen C. Buczinski
Assistant Examiner—Bernarr Earl Gregory
Attorney, Agent, or Firm—Blakely, Sokoloff, Taylor & Zafman

[57] ABSTRACT

An encrypted signature S representative of the information and of the identity of the holder of the information is established by means of a calculation algorithm for the encryption and the compression of the information to be saved. The signature S is recorded on the medium carrying the information forming the message M. The parameters for the calculation of the signature S, one or several secret keys, are recorded on at least one inviolable carrying medium. The application is to qualitative safeguarding and protection of data, on-line or not, in data bases.

27 Claims, 5 Drawing Sheets

METHOD AND DEVICE FOR QUALITATIVE SAVING OF DIGITIZED DATA

The present invention relates to a method and a device for qualitative protection of digital data recorded on a medium that can be erased or modified.

The problem of protecting access to data that had been processed or was to be processed arose with the introduction of automatic data processing. Although effective solutions were found to this problem, notably with regard to the protection of on line data stored in the databases of large data processing systems, their implementation requires the use of very large scale data processing resources. Nevertheless, this type of protection cannot claim to be absolute, as recent spectacular intrusions into defense-related databases in various countries have shown. This type of intrusion, possible mathematically and in practice, is now revealing a problem of a different nature altogether in that such intrusions are usually "transparent", the skilled "hacker" being able to operate without leaving any trace or record revealing his identity. The risk actually run because of such intrusions involves not only access to confidential or secret information, unknown to the moral authority responsible for the corresponding databases, in the case where the qualitative integrity of the data is not compromised by the intrusion, but also the risk of destruction or modification of data, whether the hacker has any fraudulent intent or not. In particular, the trade press has drawn attention to a significant growth in "computer embezzlement" through simple intrusion into the data banks of finance and banking institutions followed by fraudulent modification or falsification of accounting data.

The results of various attempts to solve a related problem have recently been published, in particular in French patent application No 2 514 593.

In the technique described in the aforementioned patent application, a message whose content is to be acted on is first subjected to contraction by Hamming code type processing. A signature is then computed from the resulting contraction using an encryption algorithm, the encrypted signature having the same number of digits or characters as there are digits or characters in the contraction.

However, the technique described in the aforementioned patent application cannot claim to be usable for qualitative protection of digital data such as that contained in a database for the following two-fold reason.

There is no way that the contraction of the original message by linear processing such as the Hamming code could claim to constitute a unique representation of the original message, as different messages can generate the same contraction. Thus qualitative protection of text is not possible since in the final analysis two different messages can produce the same contraction and therefore the same signature.

Also, as the encryption sequence applied to the contraction to produce the encrypted signature is carried out within the circuitry of a protected memory card, the computation capacity of which is modest, the contraction and the encrypted signature cannot comprise more than six characters at the most.

An object of the present invention is to remedy the aforementioned disadvantages with a view to providing, in particular, since absolute protection of access to the on line data of databanks cannot be totally guaranteed, a means of preserving the integrity of digital data by qualitative protection of the data recorded on a medium that can be erased or modified.

Another object of the present invention is the implementation of a method and a device for qualitative protection of digital data in which a signature which is perfectly representative of a unique text or message and its author is placed on the medium on which the data is recorded in clear language, the signature constituting a seal.

Another object of the present invention is the implementation of a signature method and device whereby each different text has a signature for a determined key independent of the original text.

Another object of the present invention is, in the case of transmission of information signed in accordance with the present invention, by a signatory holder, to enable the addressee user to authenticate the integrity of the information transmitted and its source.

Another object of the present invention is, through implementation of the method and the device in accordance with the invention in relation to a pseudo-information, to define a temporary random access code between the signatory of the pseudo-information and the addressee.

The qualitative protection method in accordance with the invention for digital data stored on a medium that can be erased or modified is remarkable in that it consists in establishing an encrypted signature representative of the information and of the identity of the holder of the information using a computation algorithm and recording this on the information medium. The parameters for computing the signature are recorded on at least one inviolable medium.

The qualitative protection device in accordance with the invention for digital information recorded on a medium that can be erased or modified is remarkable in that is comprises first storage means in which are stored the secret key or keys of the signatory holder or the addressee of the information and second storage means in which is stored a program for computing one or more signatures by the method in accordance with the invention. Means are provided for computing the signature or signatures and for writing the signature or signatures onto the same medium as the information to be protected. Means are also provided for comparing the signature written onto the information medium with the signature computed and for enabling use of protected information if the computed signature and the signature recorded on the information recording medium are identical. Data input or display peripheral devices enable interactive dialogue between the system and the signatory or addressee user of the data.

As will be described in detail hereinafter, the invention finds an application in the exchange of digital data between users, in protecting files entered locally, in preventing double reading of data identifying the requester, in management of programs distributed on a network to locally programmable terminals, in management of software product maintenance, in management of internal files during periodic utilization thereof, in verification of accounting and management operations, in archive storage of accounting and bibliographic information, and in preservation of program libraries, back-up copies of databases and files stored locally and centrally, by computation and comparison of the corresponding signatures.

Figure 2:
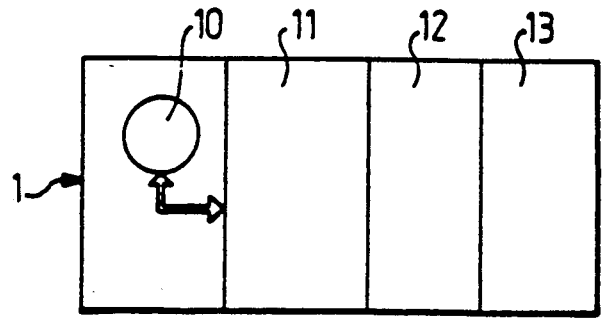
Figure 3:
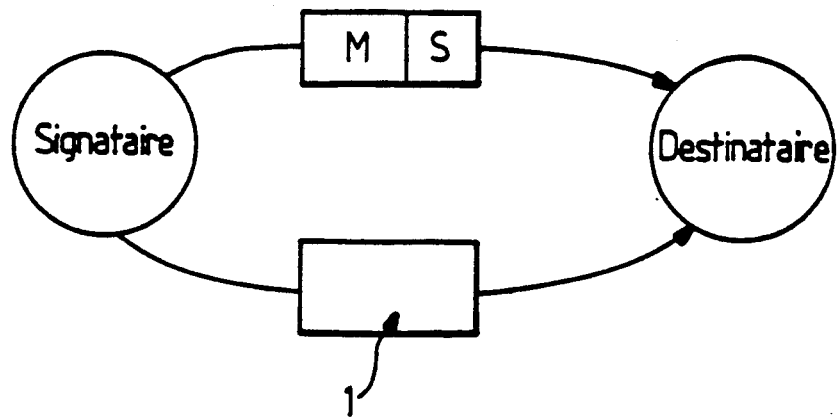
Figure 4:
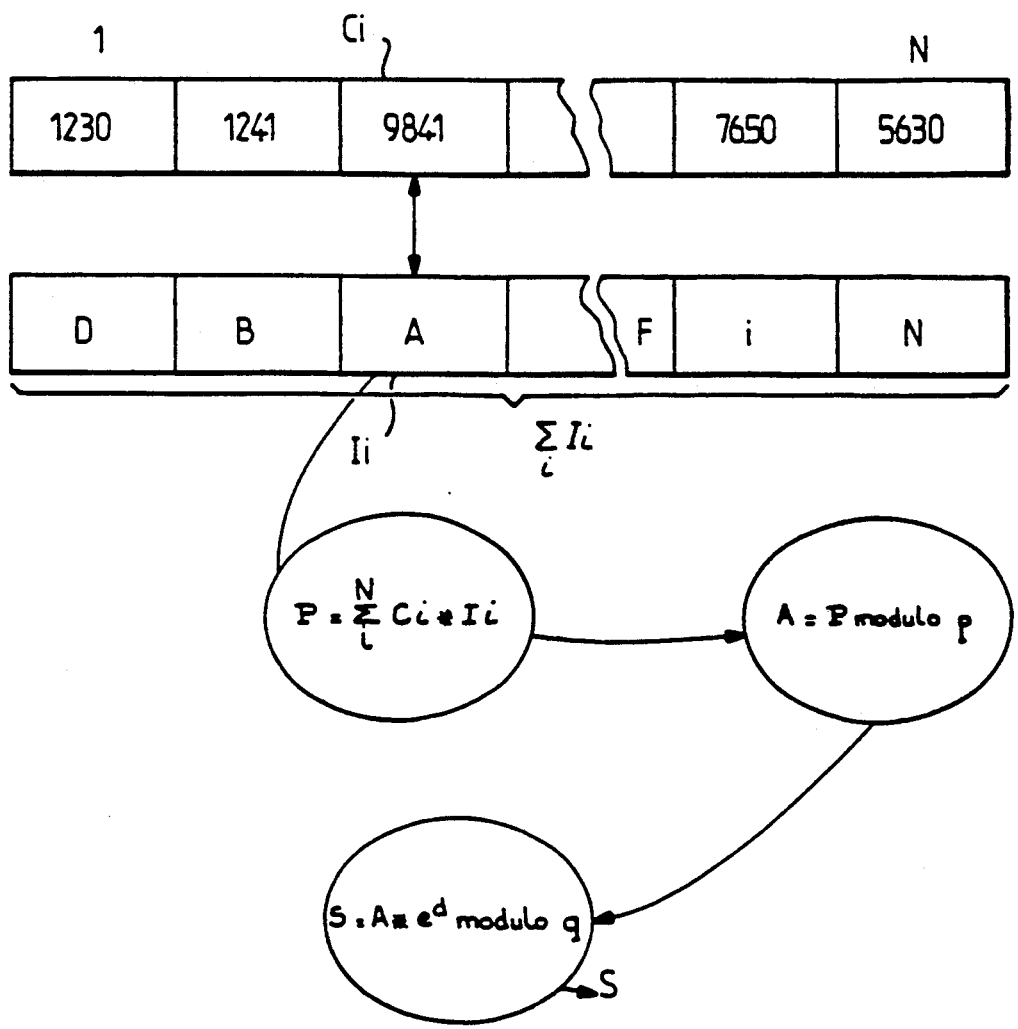
Figure 5:
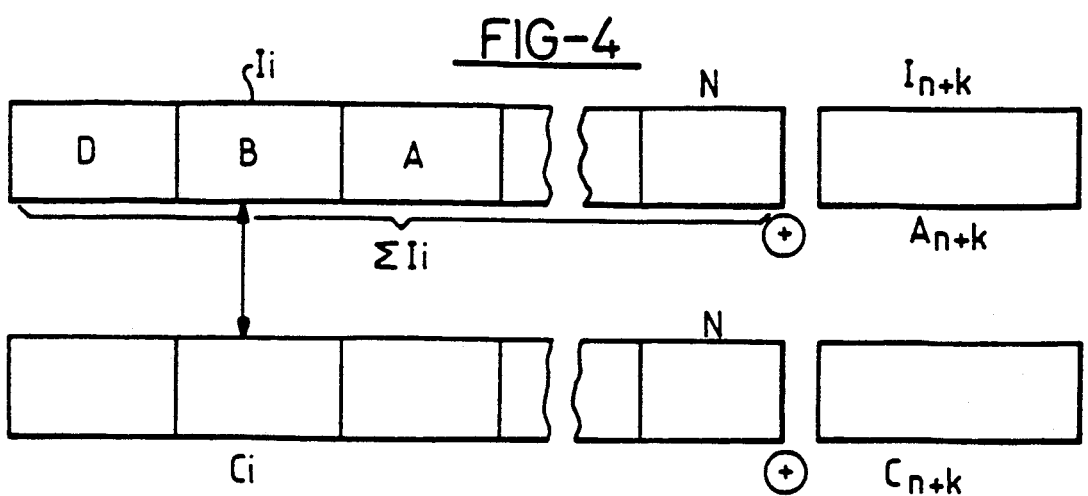
Figure 6:
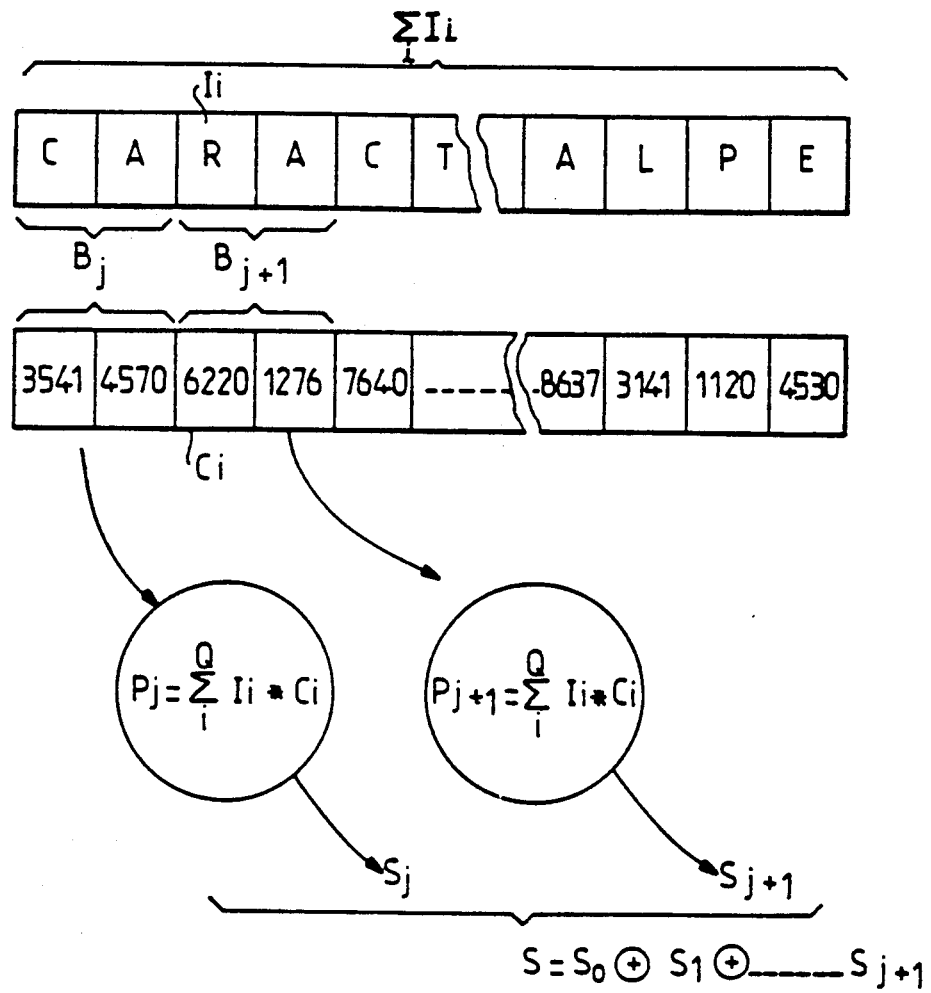
Figure 7:
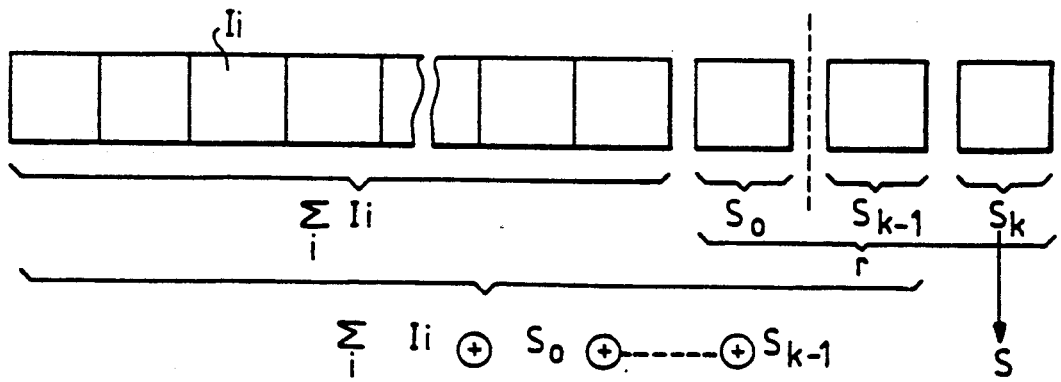
Figure 8:
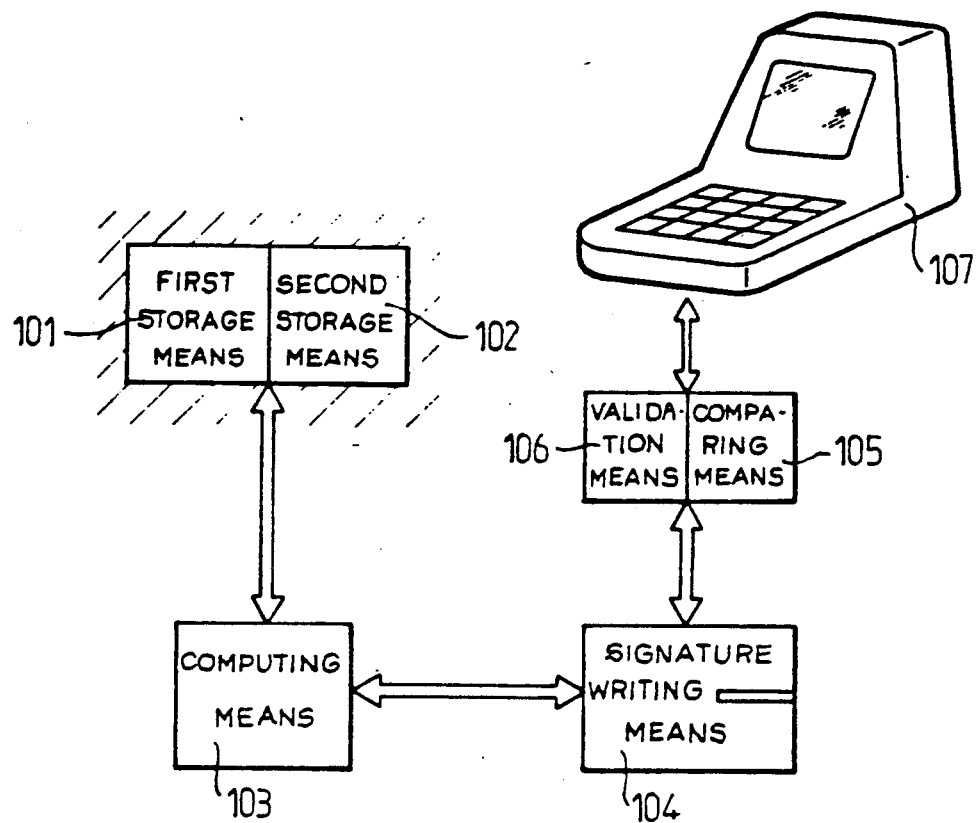
Figure 9:
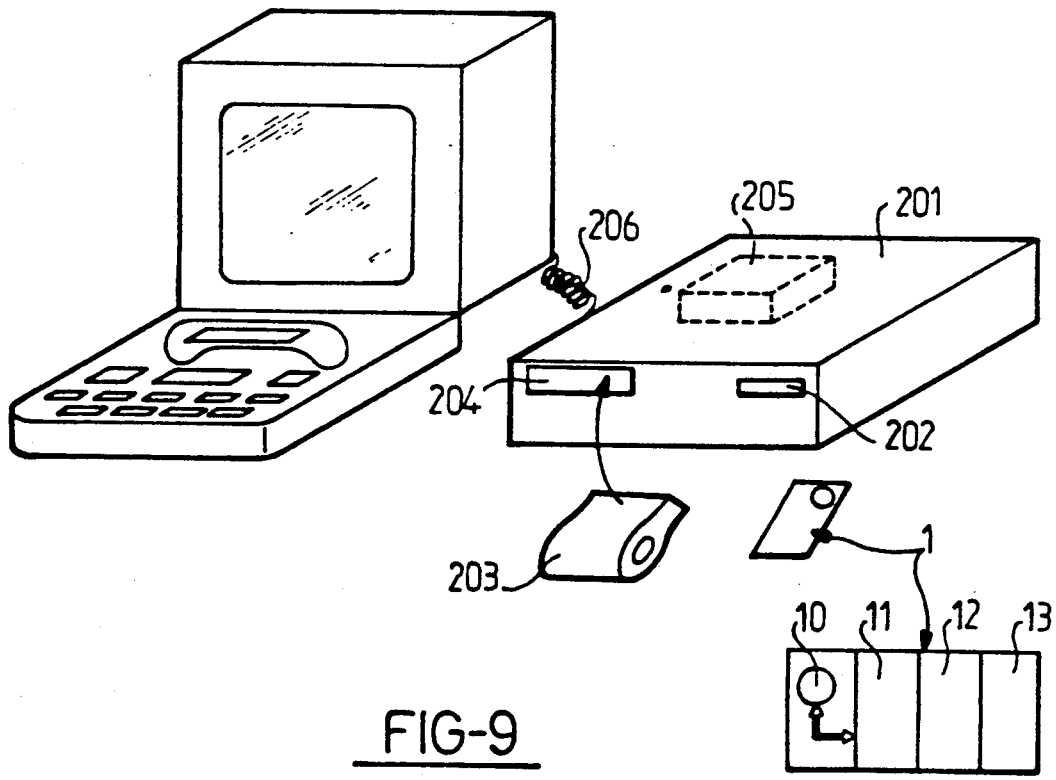
Figure 10:
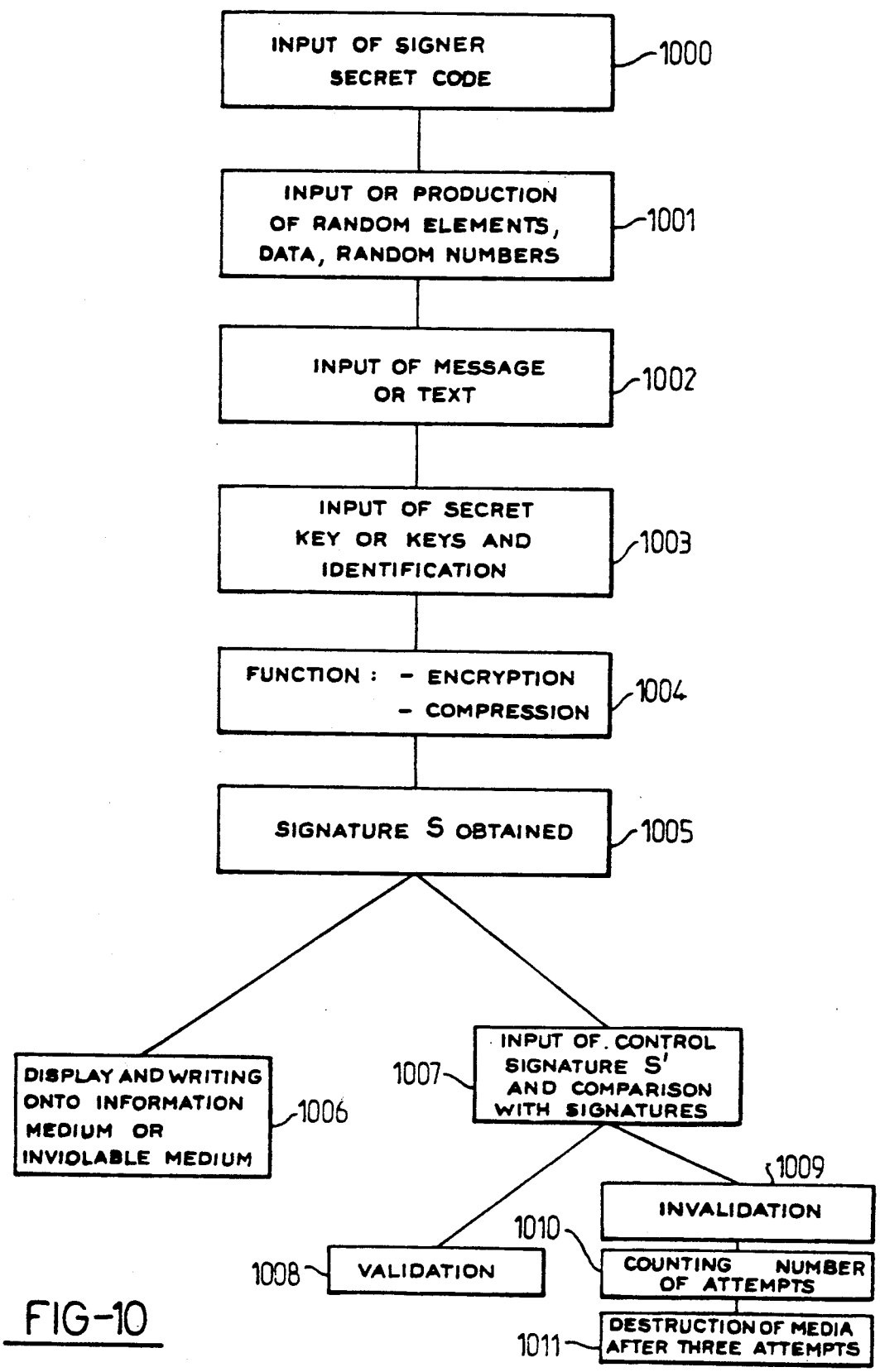

The invention will be better understood on reading the following description and referring to the accompanying drawings, in which:

FIG. 1 is a schematic representation of the essential elements in implementing the method in accordance with the invention, FIG. 2 is a schematic representation of one specific, advantageous embodiment of means for implementing the method in accordance with the invention, FIG. 3 is a diagram illustrating the quantitative information protection method in accordance with the invention in the case where the information is transmitted from a signatory to an addressee, FIG. 4 is a schematic representation of one particularly advantageous embodiment of an algorithm for computing the signature by the method in accordance with the invention, FIG. 5 shows an alternative implementation of the computation algorithm as shown in FIG. 4, FIG. 6 represents another embodiment and implementation of a signature computation algorithm as shown in FIG. 4, in the case where the quantity of information to be protected and constituting the message or text is large, FIG. 7 is a schematic representation of an alternative embodiment of the qualitative protection method in accordance with the invention, this embodiment being particularly advantageous in providing successive hierarchisation of signatures for a given text or message, FIG. 8 is a block diagram of a device for implementing the method in accordance with the invention, this device being particularly well suited to implementing the method in accordance with the invention, FIG. 9 shows an alternative embodiment of the qualitative protection device for recorded digital information in the case where the quantity of information constituting the message is relatively small and where domestic use may be envisaged, and FIG. 10 is a flowchart of the functions of the qualitative protection device for digital information in accordance with the invention, as shown in FIG. 8 or FIG. 9.

The qualitative protection method in accordance with the invention for digital information stored on a medium that can be erased or modified will first be described with reference to FIGS. 1 and 2.

Referring to FIG. 1, the qualitative information protection method in accordance with the invention consists in establishing an encrypted signature, denoted S, representative of the information and of the identity of the holder of the information, using a computation algorithm. The signature S is recorded on the same medium as the information, the information constituting a text or a message. The message or text is recorded in clear language, for example, in order to store or transmit it. Recording the message or text in clear language on a medium that can be erased or modified, means, of course, that the message or text is recorded on this medium without any kind of encryption or encoding intended to disguise its meaning.

The parameters for computing the signature S are recorded on at least one inviolable medium.

As shown in FIG. 2, the inviolable medium can advantageously be a protected memory card. FIG. 2 shows the protected memory card schematically; it comprises an active area 10 consisting of a microprocessor integrated into the card, for example, a totally inaccessible secret area 11, protected by the microprocessor 10, a read-protected and write-protected area 12 accessible only after input of a specific code, and an area 13 which can be written and read without restriction. In FIG. 1 the reference numeral 1 designates the memory card. Protected memory cards are commercially available and reference may usefully be had to French patent application No 74 10191 and additions thereto Nos 75 08184 and 75 08185 issued Mar. 10, 1980 for a more detailed description of such devices as protected memory cards.

In the method in accordance with the invention, the computation algorithm is advantageously an algorithm for encrypting the message or text to be protected and for compressing the information contained in the text to be protected on the basis of at least one secret key associated with the signatory holding the information.

The encryption and information compression algorithm denoted Ii in FIG. 1 is chosen, of course, to assure relative independence between any particular text and the signature S produced from that text. By relative independence between the content of the text or message and the signature computed using the algorithm in accordance with the present invention there is meant, on the one hand, that for a given text a single signature S is obtained and that, on the other hand, any even minimal modification of the information Ii contained in the message or in the text produces a signature S different to the original signature with no apparent correlation.

A particularly advantageous example of the use of the digital information qualitative protection method in accordance with the present invention will be described with reference to FIG. 3.

Referring to this figure, with a view to transmitting information protected by the method in accordance with the invention to an addressee, the method in accordance with the invention consists in sending the inviolable medium 1 on which the parameters for computing the encrypted signature S are recorded to the addressee and then transmitting the protected information and the encrypted signature S on the medium to the addressee. The addressee being in possession of the inviolable medium 1 that has been sent to him by any suitable means and of the message M and its signature S, he can then in order to check the content of the data transmitted and received and on the basis of the parameters for computing the signature S contained on the inviolable medium 1 establish an encrypted control signature S' on the basis of the protected information received after transmission. He can then compare the encrypted signature transmitted and received, denoted S, and the encrypted control signature denoted S'. The identity of the protected information and the information received by the addressee and the authenticated source of this information are then indicated by coincidence of the encrypted signature S and the encrypted control signature S'.

Of course, the secret key or keys constituting at least part of the parameters for computing the signature S are recorded in the inaccessible secret protected area 11 of the memory card 1 or inviolable medium, the latter having been made available to the addressee and possibly even to the signatory. Inviolable storage media such as memory cards currently offer the highest available degree of inviolability. A high level of protection is provided by the mechanical structure of this type of electronic component and by protection of access to the memory integrated into the component by a microprocessor.

However, implementation of the method in accordance with the invention is not limited to the use of an inviolable storage medium such as a protected memory card. In fact, it is possible to envisage implementation of the method using means in which the inviolable medium may consist in any circuit where access to storage areas is actively protected by a microprocessor or the like and structurally protected by any appropriate means.

One embodiment of the digital information qualitative protection method in accordance with the invention will now be described with reference to FIGS. 4 through 7.

According to one advantageous characteristic of the method in accordance with the invention, the secret key and the signature S may consist of a word containing exactly the same number of characters or digits. The signature and/or the secret key or keys may consist in a word also comprising alphanumeric characters. Thus, for a word comprising characters, for example the alphanumeric characters of the extended ASCII code, which comprises 256 characters, the probability of obtaining the secret key or keys or of obtaining the same signature S from a different text is in the order of $(1/256)^n$ or, when only digits are used, a maximum of $(1/10)^n$.

As shown in FIG. 4, with a view to establishing the encrypted signature S representative of the information and of the identity of the information holder, the computation algorithm used to encrypt the information denoted Ii and then to compress this information may, in one advantageous embodiment, consists in initializating the creation of a sequence of random or pseudo-random numbers on several digits from the secret key or keys.

In FIG. 4 the information Ii is denoted DBA and so on and the random or pseudo-random numbers on several digits are denoted Ci. Thus N random numbers are shown in this figure.

According to one particularly advantageous characteristic of the invention, the sequence of random numbers denoted Ci comprises the same number of terms Ci, or a sub-multiple of this number, as the number of characters Ii in the information to be protected. In the method in accordance with the invention, the encryption algorithm is used to compute the scalar product, denoted P, of the series of random numbers Ci and of the information Ii to be protected, term by term.

The scalar product obtained in this way is denoted:

$$P = \sum_{i=1}^{N} Ii \cdot Ci$$

The computation algorithm then applies modular reduction to the scalar product P modulo p in order to define a number A = P modulo p in which A represents the remainder on dividing P by and where p is a prime number comprising the same number of digits as there are characters in the secret key or keys or the signature S. The computation algorithm then applies modular exponentiation to the number A so as to define a number S = A * ed modulo where S represents the remainder on dividing A * ed by q and is a prime number comprising the same number of digits as there are characters in the secret key or keys or the signature and d represents one or more consecutive or non-consecutive digits of the secret key or keys. The number S obtained in this way is the encrypted signature.

To enhance the cryptographic strength of the encrypted signature S it is also possible in the method in accordance with the invention to add to the scalar product P a random value produced from supplementary random or pseudo-random numbers denoted CN +k in figure 5 and arbitrary numerical values denoted AN +k in the same figure, these being values such as the date, the time, an identification number for the information holder or an identification code for the information holder consisting of alphanumeric characters, for example, or possibly a random number of one or more digits.

The characters Ii of the information to be protected may, of course, have added to them by concatenation strings of characters representing arbitrary meaningful numerical values, such as the date, the time, an identification number or code of the information holder or a random number as previously mentioned. In this case this supplementary information is directly integrated into the information to be protected which is denoted $\Sigma Ii$. The sequence of pseudo-random numbers Ci is then, of course, completed by random numbers denoted CN +k to complete the sequence.

The method in accordance with the invention as described previously may advantageously be used in the case where the text or message to be qualitatively protected comprises 250 alpanumeric characters, for example. In this case, and for the more usual applications, the signature S and the secret key or keys may then comprise six described characters or digits, for example.

However, the digital information qualitative protection method in accordance with the invention is not limited to any such number of characters constituting the message or text. It can, of course, be used with advantage to protect qualitatively information in data banks, where the number of characters in the information can reach several thousand. In this case it is advantageous to employ for the implementation of the method a computer having a high computation capacity in order to minimize the time taken to compute the signatures S.

In the case previously described the information Ii to be protected and the random numbers Ci may advantageously be subdivided into data blocks denoted Bj, as shown in FIG. 6. The blocks Bj contain a specific number Q of characters and the scalar product P is advantageously computed for each of the blocks Bj in such a way as to define partial scalar products denoted Pj. The partial scalar products Pj are, of course, in the form:

$$Pj = \sum_{i}^{Q} Ii \cdot Ci$$

Thus a partial signature denoted Sj is computed for each of the blocks Bj and the signature sequence Sj constitutes the final signature representative of all the information to be protected.

As also shown by FIGS. 1 through 6, the random or pseudo-random numbers Ci constituting the sequences of random numbers are advantageously numbers comprising a number 1 of digits or characters equal to the number of characters in the key or keys used. In an advantageous but non-limiting way, the characters Ii of the information to be protected may be grouped in such a way that the number of digits in each term Ci in the sequence of random numbers is greater than the number of characters constituting a group. It will of course be understood that the characters constituting the information to be protected, denoted Ii, are recorded in digital form, that is to say as "0" or "1" data bits. In this case a plurality of bits constituting the complete or partial representation of a character may be grouped in such a way to constitute a group as previously defined. The term by term product of the groups or characters and of the numbers constituting the random or pseudo-random numbers of the sequence of numbers denoted Ci is to be understood as the arithmetic product of any corresponding group or character of rank i.

One particularly advantageous embodiment of the qualitative protection method for digital information stored on a medium that can be erased or modified will now be described with reference to FIG. 7.

Referring to the aforementioned figure, the method in accordance with the invention consists in, for the same quantity of information to be protected, denoted Ii and corresponding to a given length of text or message, in computing by iterative means a plurality denoted of successive signatures denoted $S_k$. The signatures Sk are of course computed by means of the computation algorithm as previously described, for example. In one advantageous embodiment of the method in accordance with the invention, the signatures denoted $S_{k-1}$ are successively integrated as character strings into the information Ii to be protected. The signatures may be integrated by concatenating them to the information Ii, for example. Following integration of a signature of rank $k-1$ to the aforementioned information Ii, a higher order signature Sk is then computed from all of the information to be protected to which the lower order signatures have been added as character strings. This results in a particularly beneficial definition of successive signatures providing for a hierarchical system of signatures and in particular of the final signature denoted $S_k$ on the basis of lower order signatures $S_0$, $S_{k-1}$ for the same information content denoted Ii. In this case the final signature Sk constitutes of course the signature S in the sense of the method in accordance with the invention or a signature with a highly hierarchical structure.

Another particularly advantageous embodiment of the method in accordance with the invention for qualitative protection of digital information may entail, previously to writing the information Ii onto the medium or the signature S onto the inviolable medium, in further subjecting the aforementioned signature S to an encryption process on the basis of a secret encryption key, for example, so as to obtain an encrypted signature denoted Sc. The encryption process may be applied to the signature S by a conventional type encryption program, for example a computation program known as a DES program or method. In this case the encrypted signature Sc contains exactly the same number of characters as the signature S. The encryption process may, of course, be applied either to the signature S obtained by simple application of the method in accordance with the invention, as already described, or after iterative application of the method, the signature S in question then being the last one obtained, of order k, as already described hereinabove.

In the case where the signature S subjected to the encryption process as aforementioned comprises a number of characters limited to six for the specific application previously described, the encryption process may then and advantageously be applied at the level of the circuitry of the inviolable medium where the latter consists of a memory card. In this case, the encrypted signature obtained, computed by the microprocessor in the memory card 1, is then transferred for writing onto the same medium as the information Ii. The production of an encrypted signature Sc of course makes it possible to improve the cryptographic strength of the signature processed in this way.

A more complete description of a device enabling implementation of the method in accordance with the invention for qualitative protection of digital information stored on a medium that can be erased or modified will now be given with reference to FIGS. 8 through 10.

As seen in FIG. 8, the device in accordance with the invention for qualitative protection of digital information comprises first storage means denoted 101 in which are stored the secret key or keys of the signatory holder or of the addressee of the information Ii constituting the text or message to be protected. Second storage means 102 are also provided to store a program for computing one or more signatures S, Sc by the method as described previously hereinabove. Also provided are means denoted 103 for computing the signature or signatures S, Sc and means denoted 104 for writing these signatures S, Sc onto the same medium as the information Ii to be protected. Means 105 are provided for comparing the signature S or Sc written onto the information medium with the computed signature and validation means 106 serve to validate use of the protected information when the computed signature S or Sc and the signature recorded on the same recording medium as the information Ii are identical. Peripheral means denoted 107 for input and/or display of data are also provided, of course, for interactive dialogue with the user.

It will be understood in particular that the device as shown in FIG. 8 may equally well be used by the signatory holder of the information to be protected as by the addressee of the protected information, the latter then having to verify the authenticity of the signature and thus that of the data received.

The first and second storage means 101 and 102 consist of inviolable storage media. It will be understood, of course, that the device in accordance with the invention as shown in FIG. 8 may consist of a computer or a microcomputer. In the case where a very large quantity of information is to be protected, such as accounting information, the computer may advantageously be one with a large computation capacity, such as an IBM 30-33 computer able to execute 4.8 million instructions per second. In this case the number of characters in the signature may advantageously be increased to 24 and a procedure of processing blocks of information denoted Bj may advantageously be employed. The programming language used for writing the corresponding computation programs may be the COBOL language, for example. On the other hand, in the case where the quantity of information or number of information items to be processed is small, that is to say for much shorter texts or messages, a commercially available microcomputer may be used. In this case, the programming language may advantageously be an assembly language. Also, the storage media constituting the first and second storage means 101, 102 may consist of inviolable storage media. In FIG. 8 the inviolable character of the media 101, 102 is represented by the shading surrounding the elements 101, 102. In the case of computers, or even of microcomputers, the corresponding memory areas may be provided with appropriate structures for rendering them inviolable. However, the inviolable storage media may equally well consist of protected memory cards. This embodiment would appear to be particularly advantageous in the particular case where the device consists in a microcomputer, for example, since microcomputers incorporating a protected memory card reader are now becoming commercially available through normal channels.

Implementing a device in accordance with the invention by means of a microcomputer is not indispensible, of course, and it may be advantageous to implement the device in accordance with the invention using less costly electronic components or systems with a view to domestic use or uses for which the quantity of information or messages or text is smaller.

In the case previously mentioned, the device for implementing the method in accordance with the invention may advantageously comprise as peripheral means a visual display terminal of the "Minitel" type distributed by the French Posts and Telecommunications Administration. In FIG. 9 a device of this kind is shown and the "Minitel" visual display terminal is referenced 200. In this figure the device in accordance with the invention further comprises a protected memory card reader denoted 201, this reader incorporating a slot denoted 202 for inserting memory cards 1. The protected memory card reader 201 is advantageously also provided with a plug-in cartridge 203 containing read only memories in which is stored the program for computing the signature or signatures S, Sc. The plug-in cartridge 203 may advantageously be plugged in within an insertion housing 204 provided in the card reader 201. The memory card reader 201 is further equipped with a microprocessor 205, the role of which is to load programs stored in the cartridge 203 and to load secret data stored in the memory card 1. It is connected to the "Minitel" type terminal 200 by a cable 206.

Also, the signature S being subjected to an encryption process as per the method as previously described, an encryption process may be stored in the protected areas of the inviolable storage medium 11 of the memory card 1, the signature S encryption computation then being done within the memory card 1.

To ensure that the system embodies a high level of user friendliness, whether the user is the signatory information holder or the addressee of the information, the device in accordance with the invention comprises in permanent memory a "menu" type management program enabling, at the initiative of the user and by interactive display of dialogue screen pages, the execution of a plurality of functions which will be described with reference to FIG. 10.

The aforementioned "menu" type program firstly serves for input at 1000 of the personal code of the signatory or addressee user. It then serves at 1001 for the input of arbitrary or random parameters, such as the date, the time or random digits. The input of these parameters may, of course, be replaced by production of these parameters by the system, in particular where the system, especially in the case of a microcomputer or computer, is provided with an internal clock from which date and time parameters can be input directly. The "menu" program also serves for input of the message or text Ii to be protected, this operation being denoted 1002. The secret key or keys and the identifier of the signatory, for example, are input at 1003. In the case where a memory card is used, the input of the secret key or keys and of the identification of the signatory at 1003 is effected by means of the inviolable medium such as a protected memory card; the input of the secret key or keys stored in the protected area of the memory card 1 can be effected, for example, after insertion of the card 1 into the reader 201 upon input of the personal code of the user on the keypad of the card reader system, the secret key or keys entered being unknown to the user, of course. In this case the addressee user is of course provided with a like memory card in which the codes and/or the parameters for computing the signature or signatures are also stored. In the case where the device does not comprise any memory card reader system 201, it is of course still possible to enter directly the secret keys and the parameters for computing the signature directly via the keyboard constituting a peripheral of the device. The degree of security required will naturally determine the most appropriate solution.

The encryption and modular compression program is then run as previously described by means of the microprocessor, microcomputer or card reader 201 associated with a visual display terminal or by the central processor unit of the computer. In FIG. 10 the computation of the signature is represented by steps 1004 and 1005. After the signature S or any other signature as previously described is obtained, display and writing onto the information medium and/or onto the inviolable medium is effected at 1006.

As shown by FIG. 10, the menu type management program also enables an addressee user to input the signature to be verified for comparison with the signature stored or transmitted. The signature S written onto the same medium as the information Ii is then compared with the control signature S', the aforementioned operations being represented at 1007 in FIG. 10. If the control signature S' and the signature S are identical, the device then proceeds to validate the signature and the information transmitted at 1008.

As is also shown by FIG. 10, in the event that the signature is not validated at 1009, the screen pages include a screen page warning of the risk of destruction of the memory areas of the inviolable medium after a specific number of unsuccessful attempts to validate the signature. The aforementioned screen pages are represented at 1011, for example, following on from a stage in which the number of unsuccessful attempts is counted, represented at 1010.

It will be understood, of course, that the signature and signature validation procedures implemented by the device previously described are separate from one another. The signature validation procedure is conditionally authorized for user identification codes which thus identify the addressee user distinct from the codes identifying the signatory user. Thus this procedure enables the addressee user to verify signatures that he cannot himself write. The only knowledge required of the addressee user to carry out this operation is, for example, the personal code of the information holder or signatory, which consists of alphanumeric characters, for example.

Another and particularly beneficial application of the method and the device in accordance with the invention will now be described, also with reference to FIG. 10. In accordance with one specific aspect of the device and of the method in accordance with the invention, for a specific identification random number input at 1001 by the user, who possesses the code of this identification random number, the input at 1002 of pseudo-information to be protected, consisting in the identical repetition of specific characters Ii over an arbitrary number of characters, makes it possible to generate a temporary inviolable random access code representative of that user. On transmission of the identification code and of the identification random number to a receiving user, the procedure for validating the temporary inviolable random access code is then authorized.

It will be understood, of course, that the pseudo-information may comprise any arbitrary character, for example an alphanumeric character of the extended ASCII code, and in particular a space character, which procures the minimum probability of error in the phase for input of a message or text relating to the pseudo-information.

It will be understood that the temporary inviolable random access code representative of the user consists, of course, of the signature computed from the pseudo-information to which has been added by concatenation the identification random number entered by the user. The method used in this way is particularly advantageous in that it enables a server organization, such as a database, to identify any subscriber on the basis of temporary random codes representative of that subscriber. Thus access to the corresponding server or database is protected by a totally renewable access code system for which the renewal period may be set arbitrarily at the initiative of the server organization. It will be understood that changing the character repeated identically at the initiative of the server organization makes it possible to bring about a complete change of the pseudo-text or pseudo-information needed to generate the identification or access code.

The method and the device in accordance with the invention thus would appear to be particularly advantageous in that they make it possible to protect access to a server organization and also to protect qualitatively digital data recorded on a medium that can be erased or modified of the server organization where the data is on line, by constructing a reference library.

Applications of the method and the device in accordance with the invention are not limited to this use only, however.

Thus the method and the device in accordance with the invention may advantageously be used for exchange of data with the outside environment, the addressee of the information, by retaining previously verified seals, readily avoiding double reading. Also, in the case of remote terminal networks, the signature may be used to protect files entered locally. It is in fact easy to verify that the signatory is approved to access payroll, invoice or like files from the host computer and that the integrity of the data has not been compromised. The signature may also be used to prevent double reading, in which case the signature is compared only with the signatures previously computer. If the signatures are identical, this indicates the existence of a reading of the corresponding file.

The method and the device in accordance with the invention may also and advantageously be used for the management of distributed programs. In a network comprising programmable local terminals the host computer must be able to check that all terminals have up to date copies of the correct programs. Verification of this kind may be effected by periodically sending a key from the host computer to each terminal. Each of the latter then computes a new seal or signature on the basis of the text of the program and the new key. On transmission of this new signature to the host computer by each terminal, the host computer compares it with the seal computed for each terminal on the basis of the text of the reference program. If the signatures or seals are identical the programs are considered to be identical.

The method and the device in accordance with the invention also make it possible to verify absence of errors in software products distributed to a large number of users. To this end the service provider distributing the software can compare the seal of the software product which has been placed at the origin by the users with that of the actual program, in order to demonstrate the existence or absence of errors and modifications.

The method and the device in accordance with the invention may also and advantageously be used to verify that no changes have been made to files between periodic uses of the files. Hash totals and accounting or financial statements can also be verified in this way. In this case the use of the method and the device in accordance with the invention make it possible to guarantee that there have been no deliberate manipulation or involuntary errors in the aforementioned statements.

Another particularly beneficial application of the method and the device in accordance with the invention consists in the archive storage of information such as accounting information. In some countries the law requires that accounting information be stored in archives for a particular time, usually 10 years. These laws naturally also demand satisfactory conditions as to the security with which the integrity of the information is preserved. As archive storage on magnetic media is permitted, the method and the device in accordance with the invention could advantageously be employed to verify that the information has remained intact and unmodified, even after many years in archive storage.

Furthermore, the method and the device in accordance with the invention may advantageously be used to assign to each back-up copy of database information a seal or signature that is absolutely representative of the content of such copies. Thus when it is necessary to use copies with their seal or signature to reconstitute the information from a damaged database, the signature may be verified before reloading.

Finally, the method and the device in accordance with the invention may be used to ensure that files used by subsidiaries of the same company locally and centrally are identical on a predetermined date. In this case, the calculation and comparison of the seals or signatures corresponding to the files suffices to ensure and guarantee identity of the files.

The method and the device in accordance with the invention are not limited to the qualitative protection of digital information, of course. They may be advantageously used to generate or create inviolable encrypted keys from a public key. In this case it suffices for the sender and the addressee of the encrypted key to be in a position to apply the method in accordance with the invention on the basis of secret parameters on the same public key, transmission of the latter being freely accessible to the public, and the secret parameters being either transmitted in a secure way or stored on an inviolable medium, of the memory card type, and sent to the sender and to the addressee for the same processing to be applied.

There has therefore been described a very high performance method and device for qualitative protection of digital information stored on a medium that can be erased or modified. The high performance of the method and the device in accordance with the invention relate to the cryptographic strength of the signature produced by the method in accordance with the present invention. This cryptographic strength would seem to result from the fact that a given text can generate virtually any signature or seal. Given this fact, only an exhaustive search would make it possible to calculate the secret key from a text and its seal or signature. The method and the device in accordance with the invention are further remarkable in that a particular text can generate any signature, this property constituting a supplementary guarantee of cryptographic strength. Also, the signature algorithm is a non-commutative function of the data. If any subset of the data, even as small as one digit, is altered, the signature will be totally different. The method and the device in accordance with the invention may be applied in particular to the case of transmission of accounts data, for example cheque clearing data. Choosing a sufficiently long signature, that is to say a sufficiently large number of characters, prevents in practice the obtaining of the secret keys by means of an exhaustive search.

We claim:

1. A method for the qualitative protection of digital information recorded on a medium that can be erased or modified, said method comprising the steps of generating an encrypted computed signature representative of the information and of the identity of a signer holder of said information by means of of a computation algorithm according to computing parameters, and recording the signature on the same medium as said information, wherein said method further comprises the steps of recording said parameters for computing said signature on at least one inviolable medium, said computer algorithm being an algorithm for encryption and compression of the information to be protected on the basis of at least one secret key associated with said signer holder of the information, said algorithm comprising the steps of:

initializing the creation of a sequence of random or pseudo-random numbers on several digits from said at least one secret key, said sequence of numbers comprising the same number $C_i$ of terms as the number $I_i$ of characters in the information to be protected, establishing term by term the scalar product P of the sequence of random numbers $C_i$ and the information $I_i$ to be protected, as defined by the equation:

$$P = \sum_{i=1}^{N} I_i * C_i$$

applying modular reduction to the scalar product modulo p so as to define a number $A = P$ modulo p in which p is a prime number comprising the same number of digits as there are characters in said at least one secret key or the signature, and applying modular exponentiation to the number A so as to define a number $S = A * e^d$ modulo q in which q is another prime number comprising the same number of digits as there are characters in the at least one secret key or the signature and d is at least one of the digits of the at least one secret key, the number S constituting the encrypted signature.

2. Method according to claim 1, wherein the inviolable medium is a protected memory card.

3. Method according to claim 1, wherein for transmitting said protected information to an addressee, said method comprises the steps of:

sending said inviolable medium on which the parameters for computing the encrypted signature are recorded to said addressee, and transmitting said protected information and the encrypted signature to said addressee.

4. Method according to claim 3 wherein for the purpose of checking the content of the data transmitted and received by the addressee said method further comprises the steps of, on the basis of the parameters for computing said encrypted signature contained on the inviolable medium:

establishing an encrypted control signal S' on the basis of the protected information received after transmission, and, comparing said encrypted signature received after transmission and said encrypted control signature, identity of the protected information and of the information received by the addressee and the authenticated source of this information being obtained when the encrypted signature is identical to the encrypted control signature.

5. Method according to claim 1, wherein the secret key constituting at least part of the parameters for computing said signature is recorded in the protected area of an inviolable medium, said inviolable medium being available to at least one of the holder of the information to be protected and the addressee of the information to be protected.

6. Method according to claim 1, wherein said secret key and the signature are each constituted by a word comprising the same number of characters.

7. Method according to claim 1, 2, 3, 4, 5 or 6, wherein the signature and the key is a word comprising alphanumeric characters.

8. Method according to claim 1, wherein there is added to the scalar product (P) a random value which is the product of additional random or pseudo-random numbers $CN+k$ and arbitrary numeric values consisting of the date, the time, an identification number of the information holder or a random number.

9. Method according to claim 1, wherein there are added by concatentation to the characters of the information to be protected character strings representative of predetermined arbitrary meaningful numeric value including the date, the time, an identification number of the information holder or a random number.

10. Method according to claim 1, wherein said information to be protected $I_i$ and the random numbers $C_i$ are subdivided into blocks containing a specific number Q of characters, the scalar product P being computed for each of the blocks in such a way as to define partial scalar products as follows:

$$P_j = \sum_{i}^{Q} I_i * C_i$$

11. Method according to claim 10, wherein a partial signature is computed for each of the blocks, the sequence of signatures constituting the signature representative of all of the information to be protected.

12. Method according to claim 1, wherein the random or pseudo-random numbers are numbers comprising a number of digits or characters equal to the number of characters of the key, the characters of the information to be protected being grouped in such a way that the number of digits of each term of the sequence is greater than the number of characters constituting a group.

13. Method according to claim 1, wherein for the same quantity of information to be protected said method comprises the further steps of computing iteratively a plurality of successive signatures, said signatures being successively integrated into the information to be protected to compute the higher order signature $S_k$.

14. Method according to claim 1, wherein before it is written onto the same medium as the information or onto the inviolable medium, said signature is further subjected to encryption processing on the basis of a secret encryption key in such a way as to obtain an encrypted signature having the same number of characters as the signature.

15. Device for qualitative protection of digital information stored on a medium that can be erased or modified, comprising:
   a) first storage means in which are stored at least one key of a signer holder or an addressee of the information,
   b) second storage means in which is stored a program for computing at least one signature representative of the information and the identity of said signer holder of the digital information,
   c) means for computing said at least one signature and means for writing the computed at least one signature onto the same medium as the information to be protected,
   d) means for comparing the at least one signature written onto the same medium as the information with the at least one computed signature,
   e) means for validating use of the protected information when the at least one computed signature and the at least one signature recorded on the medium on which the information is recorded are identical, and
   f) peripheral means for input of data and peripheral means for output of data.

16. Device according to claim 15, wherein the first and second storage means are inviolable storage media.

17. Device according to claim 16, wherein the inviolable storage media are protected memory cards.

18. Device according to claim 17, wherein said signature is further subjected to encryption processing on the basis of a secret encryption key in such a way as to obtain an encrypted signature having the same number of characters as the signature, an encryption program being stored in the protected areas of the inviolable storage medium, the encryption computation for the signature being effected within the memory card.

19. Device according to claim 15, wherein said means for computing said at least one signature comprises a computer or microcomputer.

20. Device according to claim 15, wherein the peripheral means comprises a visual display terminal and said device further comprises:
   a protected memory card reader, and
   a plug-in cartridge comprising read only memories in which is stored the program for computing the signature.

21. Device according to claim 15, wherein comprising in permanent memory a menu type management program providing for, at the initiative of the signer holder and by display of interactive dialogue screen pages:
   a) input of personal code of the signatory of addressee user,
   b) input or arbitrary or random parameters such as the date, the time or random numbers, and
   c) input of the information to be protected.

22. Device according to claim 21, wherein the menu type management program also enables a user:
   a) to input the signature to be verified for comparison with the signature stored or transmitted, and
   b) to display the validation of this signature.

23. Device according to claim 21 or 22, wherein said screen pages comprise a screen page warning of the risk of destruction of memory areas of the inviolable medium after a predetermined number of unsuccessful attempts to validate the signature.

24. Device according to claim 23, wherein the signature and signature validation procedures are separate, the signature validation process being conditionally authorized for user identification codes for the user identifying himself separate from the signer user identification codes.

25. Device according to claim 22, wherein the signature and signature validation procedures are separate, the signature validation process being conditionally authorized for user identification codes for the user identifying himself separate from the signer user identification codes.

26. Device according to claim 15, wherein for a particular identification random number input by the user possessing the identification code, the input of dummy information to be protected comprising an identical repetition of characters over an arbitrary number of characters makes it possible to generate a temporary inviolable random access code representative of this user.

27. Device according to claim 26, wherein on transmission of the identification code and of the identification random number to a receiving user, the procedure for validation of the temporary inviolable random access code is authorized.

* * * * *